(12) United States Patent
Ahmed

(10) Patent No.: US 11,949,305 B2
(45) Date of Patent: Apr. 2, 2024

(54) PARALLEL PATH HAIRPIN WINDING CONNECTION WITH THE LEAD TERMINALS AND NEUTRAL TERMINAL BRIDGES ON THE CROWN SIDE

(71) Applicant: FORD GLOBAL TECHNOLOGIES, LLC, Dearborn, MI (US)

(72) Inventor: Adeeb Ahmed, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

(21) Appl. No.: 17/583,034

(22) Filed: Jan. 24, 2022

(65) Prior Publication Data

US 2023/0261537 A1  Aug. 17, 2023

(51) Int. Cl.
*H02K 3/28* (2006.01)
*H02K 3/04* (2006.01)
*H02K 3/50* (2006.01)

(52) U.S. Cl.
CPC .......... *H02K 3/28* (2013.01); *H02K 3/04* (2013.01); *H02K 3/50* (2013.01); *H02K 2203/06* (2013.01)

(58) Field of Classification Search
CPC ........ H02K 3/50; H02K 2203/06; H02K 3/12; H02K 3/28; H02K 3/14; H02K 3/04; H02K 5/225; H02K 15/064; H02K 15/0414; H02K 3/52; H02K 3/521
USPC .......................................................... 310/71
See application file for complete search history.

(56) References Cited

U.S. PATENT DOCUMENTS

| | | | |
|---|---|---|---|
| 6,940,204 B2 | 9/2005 | Yamazaki et al. | |
| 7,034,428 B2 | 4/2006 | Cai et al. | |
| 7,622,843 B2 | 11/2009 | Cai | |
| 9,819,238 B2 | 11/2017 | Ikura et al. | |
| 9,876,405 B2 | 1/2018 | Han et al. | |
| 10,707,713 B2 | 7/2020 | Liang et al. | |
| 10,971,979 B2 | 4/2021 | Miyazaki et al. | |
| 11,063,488 B2 | 7/2021 | Shin et al. | |
| 11,264,858 B2 | 3/2022 | Dunn | |
| 11,283,335 B2 | 3/2022 | Ruggieri et al. | |
| 11,356,004 B2 | 6/2022 | Choi | |
| 2020/0381969 A1* | 12/2020 | Ahmed | H02K 3/505 |
| 2020/0395804 A1 | 12/2020 | Ahmed et al. | |
| 2021/0218305 A1 | 7/2021 | Tang et al. | |

(Continued)

FOREIGN PATENT DOCUMENTS

DE       10321956           3/2004
WO  WO-2021065297 A1 *  4/2021  ............... H02K 3/50

*Primary Examiner* — Alexander A Singh
(74) *Attorney, Agent, or Firm* — David B. Kelley; Brooks Kushman P.C.

(57) ABSTRACT

An electric machine having a plurality of AC power phases comprises a rotor, a stator defining a plurality of slots, and a plurality of pins inserted into the slots. The pins are each joined together with circumferentially adjacent pins arranged in an even number of paired parallel winding paths. Each of the paired winding paths include five pitch pins and seven pitch pins that are radially adjacent and insulated from each other. The five pitch pins are electrically connected and circumferentially followed by seven pitch pins in the winding paths in a repeating pattern throughout the paired winding paths from separate phase terminals to a neutral bridge terminal. Neutral terminals and lead terminals are connected to the conductive paths by various combinations of I-pins and half-crown pins.

17 Claims, 6 Drawing Sheets

(56) References Cited

U.S. PATENT DOCUMENTS

| | | |
|---|---|---|
| 2021/0399603 A1 | 12/2021 | Kim |
| 2022/0006343 A1 | 1/2022 | Schneider et al. |
| 2022/0190696 A1 | 6/2022 | Jang |
| 2022/0200384 A1 | 6/2022 | Ahmed |
| 2022/0255390 A1* | 8/2022 | Grospeaud ............... H02K 3/12 |
| 2022/0344997 A1* | 10/2022 | Takada .................... H02K 3/50 |

* cited by examiner

PARALLEL PATH HAIRPIN WINDING CONNECTION WITH THE LEAD TERMINALS AND NEUTRAL TERMINAL BRIDGES ON THE CROWN SIDE

TECHNICAL FIELD

This disclosure relates to conductors for electric machines that provide propulsion for electric vehicles.

BACKGROUND

Electric vehicles, for example hybrid vehicles, partial hybrid vehicles, plug-in vehicles and the like, may have an electric machine for propelling the vehicle and for storing energy from regenerative braking. The electric machine receives power from a high voltage traction battery that provides direct current (DC) to a variable voltage inverter that supplies multi-phase alternating current (AC) to the electric machine.

Electric machines are known that use shaped wire pins, also known as "hairpins" (hereinafter "pins") in place of windings on the stator of the electric machine. Pins are thin wire-like members that are received in receptacles, or axially extending slots, on the stator that are arranged in a nested circumferential array on the stator core. The pins have spaced legs that are welded together to create a conductor path. One path is provided for each phase of the alternating current. Two parallel conductor paths are provided to increase the efficiency of the electric machine. The pins form a crown at one axial end of the stator. The crown end protrudes several millimeters out of the stator core. The pins are twisted and welded or soldered to adjacent pins at the other axial end of the stator.

Pin geometry is created by forming a metal rod or pin in a precise pattern to create separate conductor paths. The pins are coated with enamel that insulates the pin from adjacent pins that are not in the same conductor path.

The pins are inserted into axially extending slots in the stator core that are adapted to receive a plurality of pins (e.g., six or eight pins per slot). The pins are stacked in the slots from an inner diameter of the slot to the outer diameter of the slot and are assigned numeric location identifiers (e.g., for eight conductors per slot, L1 is at the ID of each slot and L8 is at the OD of each slot with the intervening locations being identified as L2 to L7). The number of pins received in the slots may be another even number other than eight. A slot will receive 8 hairpins when there are 8 conductors per slot. Four of them will come from the left and occupy the even locations and four will come from the right and occupy the odd locations. In the locations in the slots adjacent to the ID and OD (e.g. L1 and L8 in an eight location slot) the pins are inserted in the slots at locations at the same radius from the central axis of the stator core.

The number of pins received in the slots will be equal to the number of conductors per slot of the machine. Half of these pins will be originating in the odd radial locations in a slot (e.g., L1, L3 . . . ) and will be travelling in counter-clockwise direction eventually ending at even radial locations at a different slot. The rest of the pins will be originating at even radial locations (e.g., L2, L4 . . . ) and will travelling in clockwise direction eventually ending at odd radial locations of a different slot. Clockwise and counter-clockwise direction are referred while looking at the winding with crown side on the top. In some special cases (e.g., lead or neutral pins), the pins will not travel in CW and CCW direction to a different slot but rather connect to the lead or neutral bridge of the respective conductive path.

There exist some special hairpins that which travel in opposite direction compared to regular pins (e.g., the pins starting at odd radial layers. L1, L3 . . . ) will travel in clockwise direction and vice versa. These hairpins are situated in slots which occupies the lead or neutral pins (I pins).

One problem faced in the design of stator cores for electric machines having pins is to simplify manufacturing processes and, in particular, simplifying the process of connecting the pins to lead terminals and neutral bridge terminals. Another problem is minimizing the types of pins having a specified number of pitches required to assemble the stator core pin assembly. The need for large and complex jumpers in the stator assembly also poses problems in some designs. Reducing the space required for the pin assembly in the stator is another problem that must be addressed to accommodate adjacent transmission components.

This disclosure is directed to solving the above problems and other problems as summarized below.

SUMMARY

According to one aspect of this disclosure, a stator is disclosed for an electric machine of an electric vehicle. The stator includes a stator core and a plurality of pins arranged to form an electrical winding. The stator core defines a plurality of slots that are arrayed circumferentially around a central axis of the stator. The plurality of pins are joined together with adjacent pins in conductive paths for each AC power phase. The pins are arranged in an even number of parallel winding paths that start and end on a crown side of the stator.

According to another aspect of this disclosure, an electric machine is disclosed that has a plurality of AC power phases. The electric machine has a rotor and a stator that defines a plurality of slots. The stator is adapted to receive a plurality of pins that are each joined together with circumferentially adjacent pins to form conductive paths for each power phase. The pins include only 5-pitch pins and 7-pitch pins. The pins in each conductive path alternate with 5-pitch pins being connected in series with one of the 7-pitch pins that is repeated throughout the stator core assembly from a lead pin connector to a neutral pin connector.

Another embodiment an electric machine is disclosed that has a plurality of AC power phases and comprises a rotor and a stator that defines a plurality of slots for receiving a plurality of pins. The pins are joined together with circumferentially adjacent pins arranged in an even number of paired parallel winding paths. Each of the paired parallel winding paths include five pitch pins and seven pitch pins that are radially adjacent and insulated from each other. The five pitch pins are electrically connected and circumferentially followed by seven pitch pins in the winding paths in a repeating pattern throughout the paired parallel winding paths from the separate phase terminals to the neutral terminals.

The above disclosed stator embodiments may also be further characterized as having four parallel winding paths. Two of the paired winding paths may start at a phase terminal at an inner diameter of the stator and extend to a neutral terminal at an outer diameter of the stator. Two of the paired winding paths may start at a phase terminal at an outer diameter of the stator and extend to a neutral terminal at an inner diameter of the stator.

Other further features of the above disclosed stators may be further characterized by terminals on the crown side that are connected to the conductive paths with at least one I-pin that extends in an axial direction from a leg portion that is axially received in one of the slots and extends solely in an axial direction to a terminal on the crown side of the stator. The crown side may include at least one phase lead terminal and at least one neutral terminal that is an I-pin.

The stator may further comprise terminals on the crown side that are connected to the conductive paths with at least one half-crown pin that extends from a leg portion that is axially received in one of the slots, wherein the half-crown pin extends in a circumferential direction and an axial direction to one of the terminals on the crown side of the stator. The crown side may include at least one phase lead terminal that is an I-pin and at least one neutral terminal.

The above aspects of this disclosure and other aspects will be described below with reference to the attached drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
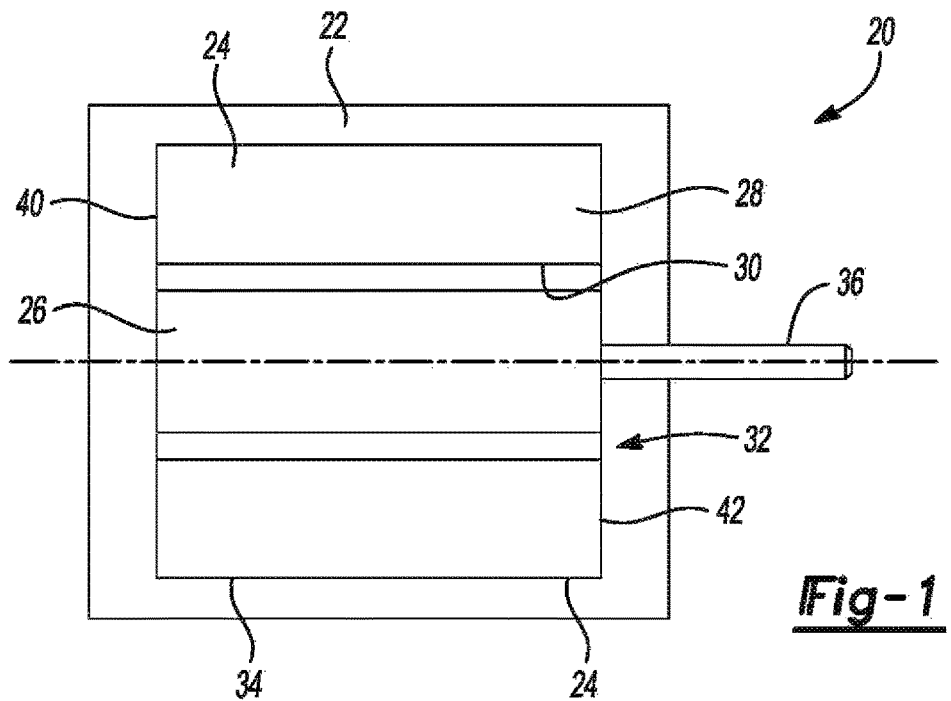
FIG. 1 is a schematic diagram of an electric machine.

Referring to FIG. 1, an electric machine generally indicated by reference numeral 20 is schematically illustrated for a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 functions as both a motor to propel the vehicle and as a generator such as during regenerative braking.

The electric machine 20 may be powered by a traction battery of the vehicle. In a regenerative mode, the electric machine 20 may act as a generator and store energy in the battery. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Referring to FIG. 1, the electric machine 20 includes a housing 22 that encloses the stator 24 and the rotor 26. The stator 24 is fixed to the housing 22 and includes a cylindrical core 28 having an inner diameter 30 that defines a hole 32 and an outer diameter 34. The core 28 may be formed from a plurality of stacked laminations. The rotor 26 is supported for rotation within the hole 32. The rotor 26 may include windings or permanent magnets that interact with windings of the stator 24 to generate rotation of the rotor 26 when the electric machine 20 is energized. The rotor 26 may be supported on a driveshaft 36 that extends through the housing 22. The driveshaft 36 is configured to be coupled with a drivetrain of the vehicle.

Figure 2:
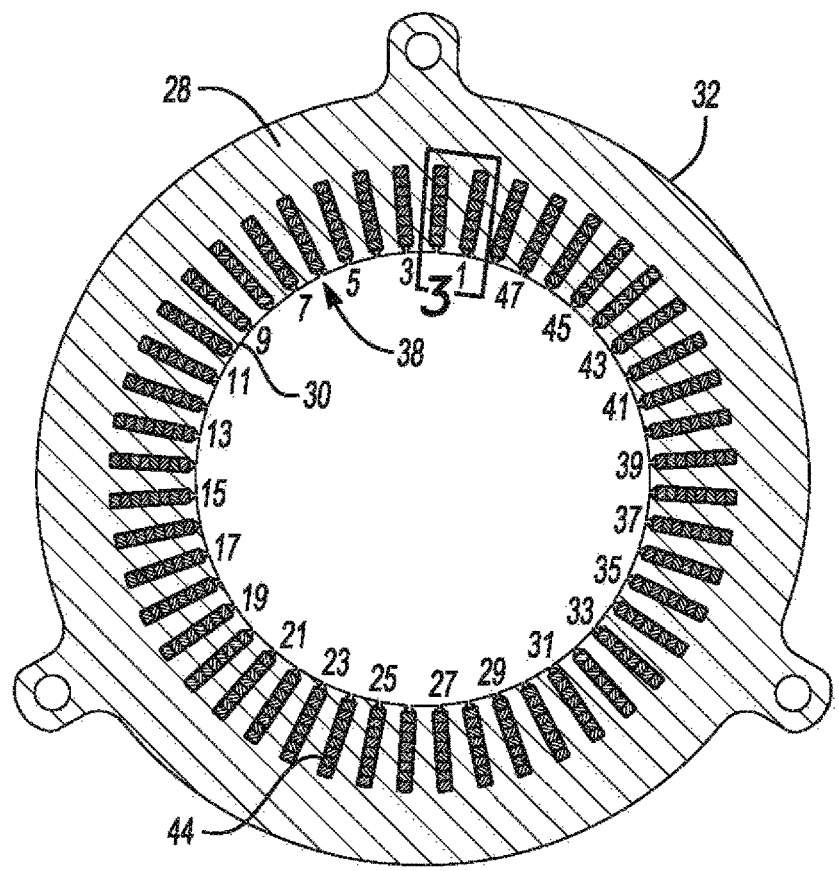
FIG. 2 is a cross-section end view of a stator of the electric machine.
Figure 3:
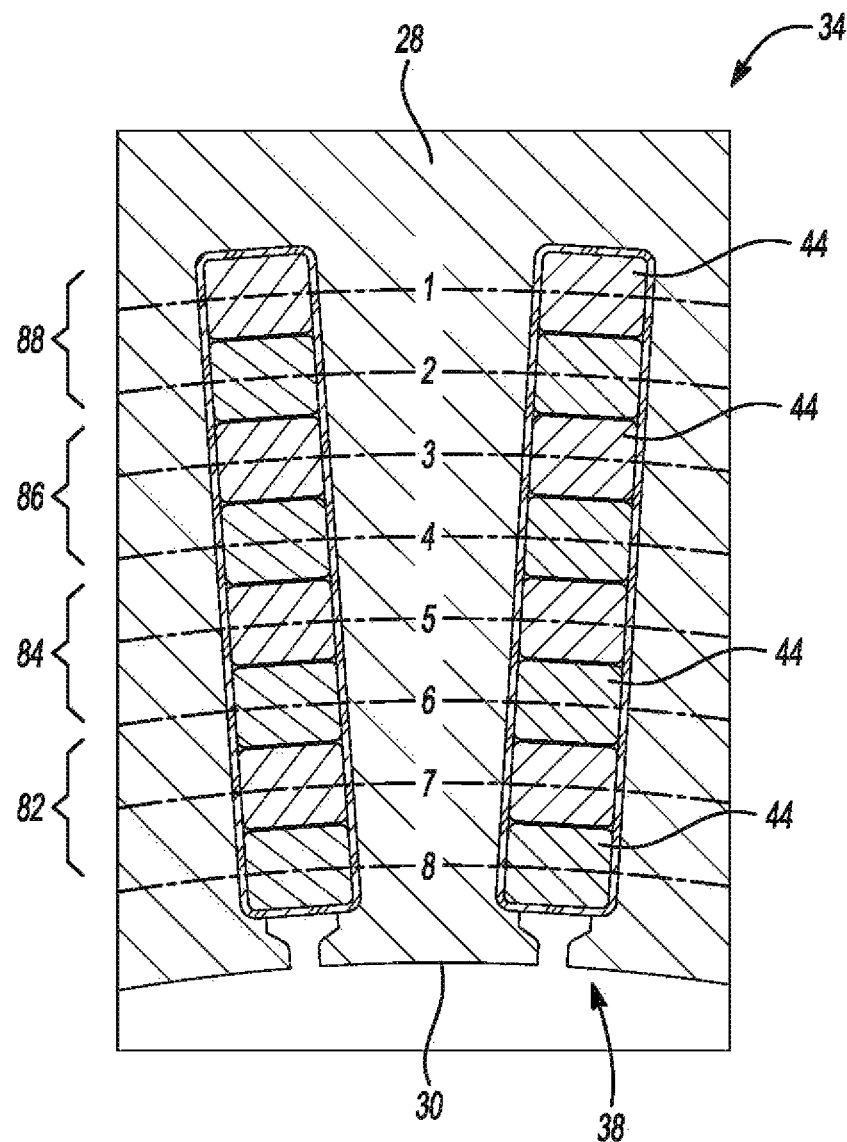
FIG. 3 is a magnified view of a portion of the stator within dashed line box 5 in FIG. 4.

Referring to FIGS. 2 and 3, the stator core 28 defines slots 38 circumferentially arranged around the core 28 and extending outward from the inner diameter 30. The slots 38 are equally spaced around the circumference. The slots 38 extend axially from a crown end 40 of the core 28 to a twist end 42 (as shown in FIG. 1). In the embodiment of FIG. 2, the core 28 defines forty-eight slots and has eight poles. Each pole covers 180 electrical degrees, which corresponds to six slots in the illustrated embodiment. For convention herein, Pole 1 starts at slot 1 and includes slots 1 through 6, Pole 2 starts at Slot 7 and includes slots 7 through 12, etc. The poles may be discussed in pairs. Pole pair 1 includes poles 1 and 2; pole pair 2 includes poles 3 and 4; pole pair 3 includes poles 5 and 6; and pole pair 4 includes poles 7 and 8. In the illustrated embodiment each pole pair includes 12 slots. The core 28 may include more or fewer slots and/or poles in other embodiments. For example, the core 28 may define seventy-two slots and have eight poles.

The slots 38 are spaced by a circumferential distance measured between the center lines of two adjacent slots. This distance can be used as a unit of distance (hereinafter "a slot") for relating and measuring other components of the stator 24. The distance unit "slot" is sometimes referred to as "slot pitch" or "slot span."

The electric machine 20 includes hairpins 44 placed in the slots 38 of the core 28. Hairpins 44 are an emerging technology that improves efficiency for electric machines used in vehicles. The hairpin windings 44 improve efficiency by providing a greater amount of stator conductors to reduce resistance of the winding 44 without encroaching into space reserved for the electrical steel and the magnetic flux path. The hairpin windings 44 may be wave windings that weave pole to pole in a wave-like pattern.

Figure 4:
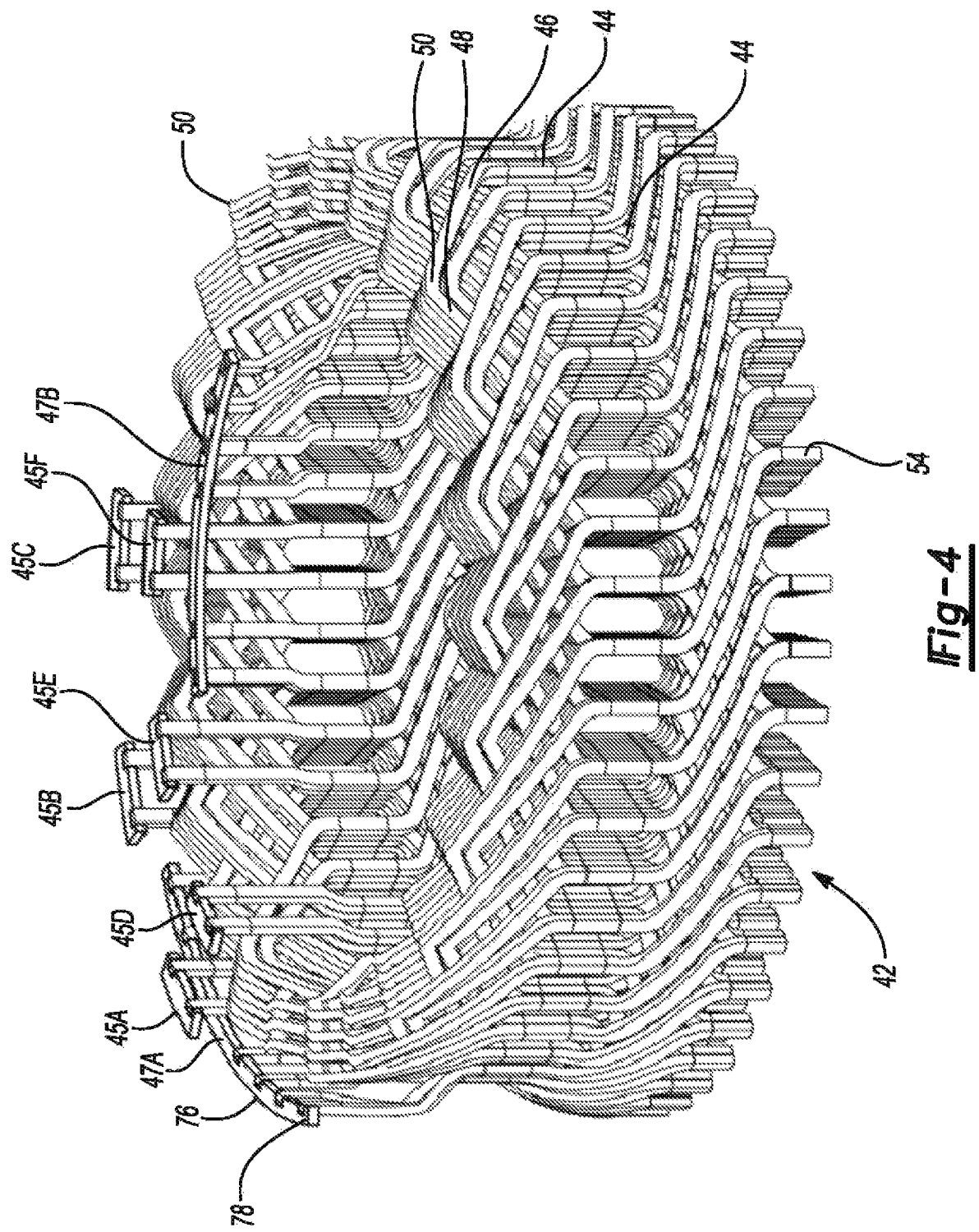
FIG. 4 is a perspective view of a winding of the electric machine oriented to show the terminal connections on the inner diameter with legs of the hairpins substantially shortened for illustrative purposes.
Figure 5:
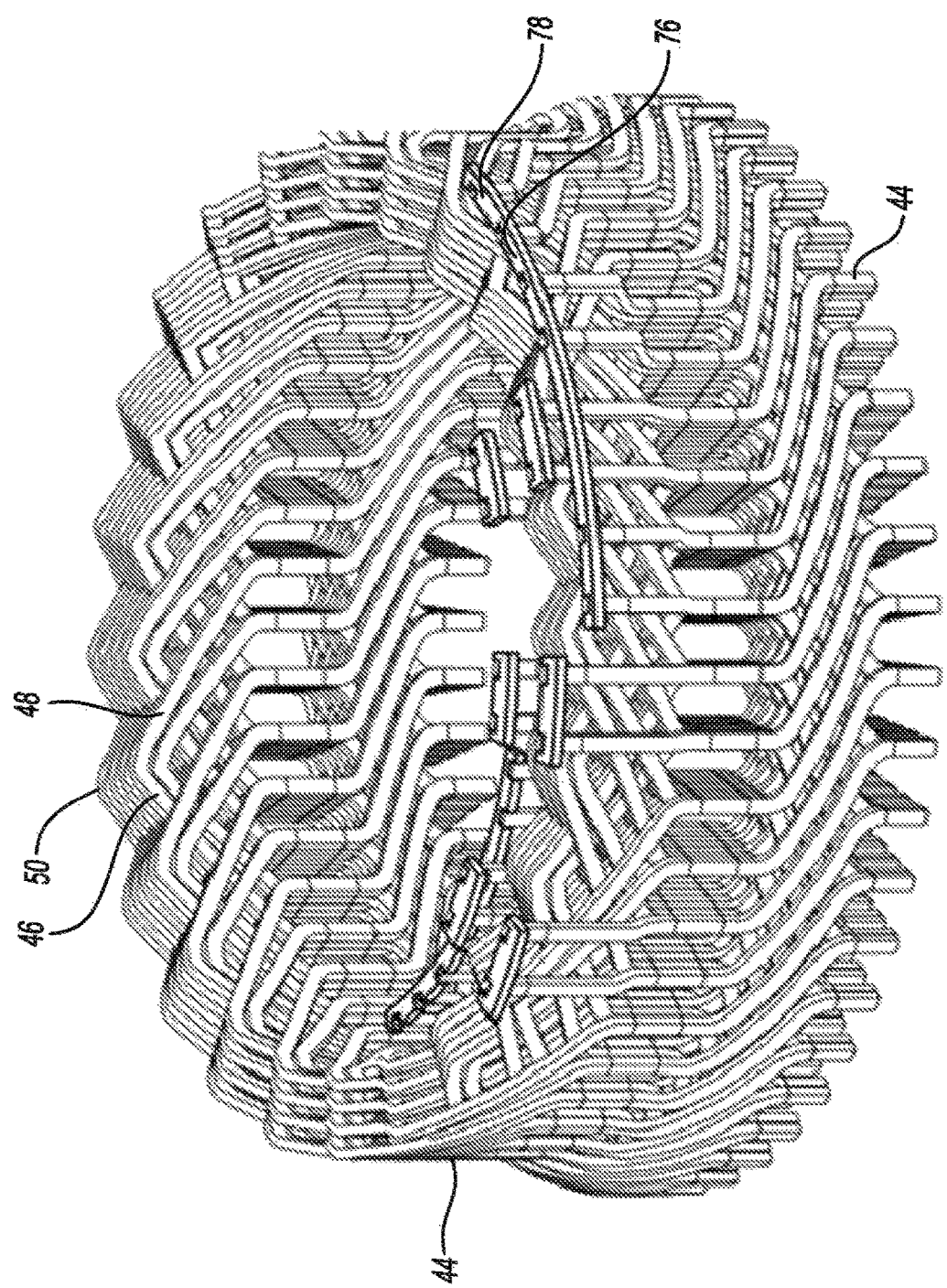
FIG. 5 is a perspective view of a winding of the electric machine oriented to show the terminal connections on the outer diameter with legs of the hairpins substantially shortened for illustrative purposes.

Referring to FIGS. 1, 4, and 5, the electric machine 12 is a three-phase machine in which the hairpins 44 are arranged to have a U-phase, a V phase, and a W phase. In one embodiment, each phase includes sixteen hairpins 44 (also known as pins, pins, or bar conductors) arranged in a parallel path including two parallel conductive paths. In a three-phase system three of the parallel conductive paths are provided, one for each of the three phases. A set of six phase lead terminals 45A-45F are shown in FIGS. 2 and 3 with each of the three parallel conduction paths being connected to one of the terminals. Two neutral terminal 47A and 47B are each connected to the parallel conduction paths.

One challenge with hairpin winding is matching the electric machine design to the desired torque-speed curve. An essential step in designing an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape to make the connection possible. This limits the number and size of the conductors that can be fit in a single slot. Another challenge is creating parallel circuits that are balanced (i.e., not causing large circulating currents in the loop formed by the parallel circuits due do dissymmetry) and have reasonably complex connections. The electric machine 20 solves these and other problems.

The hairpins 44 are generally U-shaped and include a first leg 46 and a second leg 48 joined by a crown 50. The hairpins 44 are installed in the stator core 28 by inserting the legs 46, 48 each into one of the slots 38. All the hairpins 44 are installed from the crown end 40 of the stator core 28, so that all the crowns 50 are located at the crown end 40 of the stator 24, and the twist ends 54 of the legs are located on the twist end 42. Once installed, the legs 46, 48 of the hairpins 44 are bent away from each other to from twists that connect with the twists of other hairpins. The twist ends 54 of corresponding hairpins are arranged in rows and joined by a connection such as a weld or by soldering.

Each phase has the same structure and includes four paths that spiral around the stator 24. For brevity, only the U-phase is described below with the understanding that the V and W phases are identical but circumferentially shifted to slots adjacent to the U-phase.

The U-phase may include a first path 56, a second path 58, a third path 60, and a fourth path 62. The paths are formed by the interconnected pins 44. Each of the paths includes a first path end 64 that starts at the U-phase terminal 66 and a second path end 68 that ends at a neutral connection. In the illustrated embodiment, the electric machine 20 includes an inboard neutral connection 70 and an outboard neutral connection 72. The first and second paths 56, 58 connect to the outboard neutral connection 72 and the third and fourth paths 60, 62 connect to the inboard neutral connection 70. The paths may be arranged in pairs with the first and second paths 56, 58 being a pair and the third and fourth paths 60, 62 being a pair. The paths may be referred to as pair because the paths wind through the stator core 28 in the same direction and are adjacent to each other.

The first and second paths 56, 58 start near the inner diameter (ID) 30 of the stator core 28 and have extended terminal leads 74 that are adapted to be connected to the U-phase terminal 66. The first and second paths 56, 58 wind in the counterclockwise direction as viewed from the crown end 40 through the slots 38 and end near the outer diameter (OD) 34 at the outboard neutral connection 72. The first and second paths 56, 58 in the illustrated embodiment wind around the stator core approximately four times. The third and fourth paths 60, 62 start near the OD 34 of the stator core 28 and wind in the clockwise direction as viewed from the crown end 40 through the slots 38. The third and fourth paths 60, 62 wind around the stator core approximately four times and end near the ID 30 at the inboard neutral connection 70. In the illustrated embodiment, each of the paths includes sixteen pins that are interconnected end-to-end to form a continuous conductor. The paths are connected by either I-pins or half-crown pins to either the phase terminals or the neutral connection bridges, as will be described below.

The windings 44 do not require extended jumpers because they are directly connected to adjacent hairpins 44. A jumper is a conductor that is typically disposed at one of the ends of the stator core and does not extend through a slot. Jumpers are used in the prior art to connect hairpins that are spaced apart such that they cannot be directly connected to each other. Jumpers add mass to the windings and require additional manufacturing steps. Costs can be reduced, and manufacturing efficiencies can be gained, by designing windings that do not require jumpers.

Neutral connections 70 or 72 may include a bridge 76 comprising a strip of conductive metal. The bridge 76 defines openings 78 (shown in FIGS. 4 and 5) that are connected by I-pins or half-crown pins to the paths of hairpins 44. In the illustrated embodiment, each of the bridges 76 define six openings 78. The openings 78 may be grouped in pairs with each pair being associated with one of the phases.

Referring to FIG. 2, the slots 38 may include an inner radial layer of pins 82, an inner middle radial layer of pins 84, an outer middle radial layer of pins 86, and an outer radial layer of pins 88. Each layer includes two radial pin positions that are adjacent to each other. In the illustrated embodiment, each slot 38 has eight sequential pin positions in a one-by-eight linear arrangement, however, other slot and pin arrangements are possible. The first position is nearest the OD 34 of the stator core 28 and the eighth position is nearest the ID 30 of the stator core 28. The inner layer 82 includes the seventh and eighth positions; the inner middle layer 84 includes the fifth and sixth positions; the outer middle layer 86 includes the third and fourth positions, and the outer layer 88 includes the first and second positions.

Figure 6:
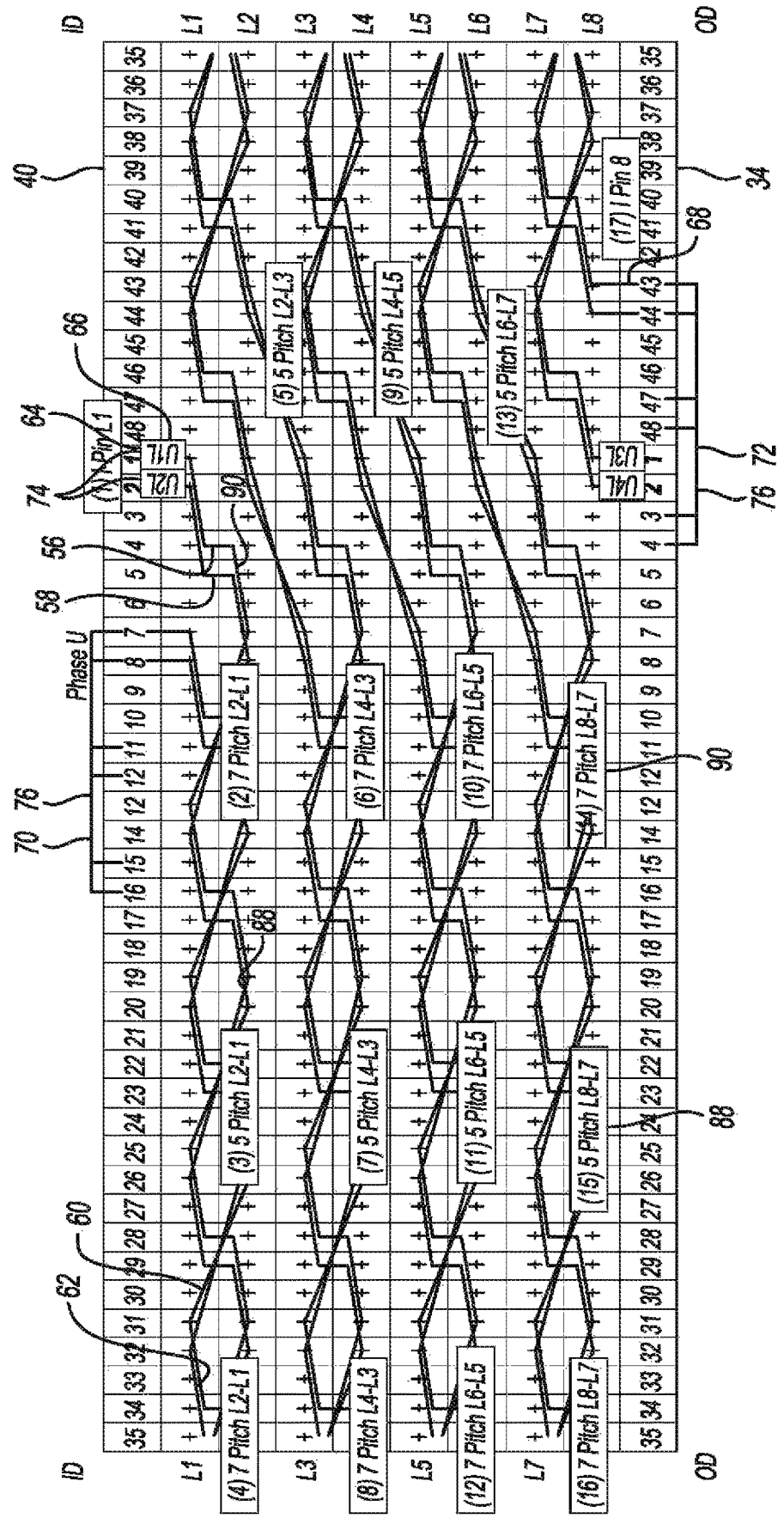
FIG. 6 is a winding diagram of the pitch path for the U-phase of the stator.

Each of the slots 38 may only contain a single phase, e.g., slot 1 only contains the U-phase. The phases are arranged in groups to occupy adjacent slots in each of the poles, e.g., Slots 1 and 2 contain the U-phase, Slots 3 and 4 contain the V-phase, and Slots 6 and 7 contain the W-phase. Each slot includes two different paths of the same phase. For example, Slot 1 only includes path 56 and path 60 of the U-phase and Slot 2 only includes path 58 and path 62. These paths alternate every other pin position along their respective slots as best shown in FIG. 6.

The stator 24 is balanced with each path being disposed in the stator core 28 such that, for each radial layer, the path is disposed in the odd slots and the even slots a same number of times. For example, in the inner radial layer 80, the first path 56 is disposed in the odd slots four times (slots 1, 7, 13, and 43) and is disposed in the even slots four times (slots 20, 26, 32, and 38).

The V and W phases of the windings 44 may be the same or similar to the U-phase but are circumferentially shifted to different slots. For brevity, Applicant will not repeat all of the above information in explaining the V and W phases.

Referring to FIGS. 7-12, the hairpins 44 in each of the paths may include one or more types of hairpins. Different types of hairpins may differ in shape or size. 5-pitch pins 88 and 7-pitch pins 90 are used to form the paths 56, 58, 60, 62 in the stator 24 as previously described. The paths are joined to the neutral terminals with connectors 70, 72, and phase terminals, such as U-phase terminal 66.

For example, while the possible number of poles, slots per pole, and layers may vary, it is not practical in a pin conductor to have as many turns per coil as in a stranded winding. Each pin needs to be connected at the connection end 30 to the next pin by welding, soldering or the like, and needs to be bent according to a specific shape in order to make the connection possible. Another challenge is creating parallel circuits that are balanced (i.e., not causing large circulating currents in the loop formed by the parallel circuits due do dissymmetry) and have robust connections.

Figure 7:
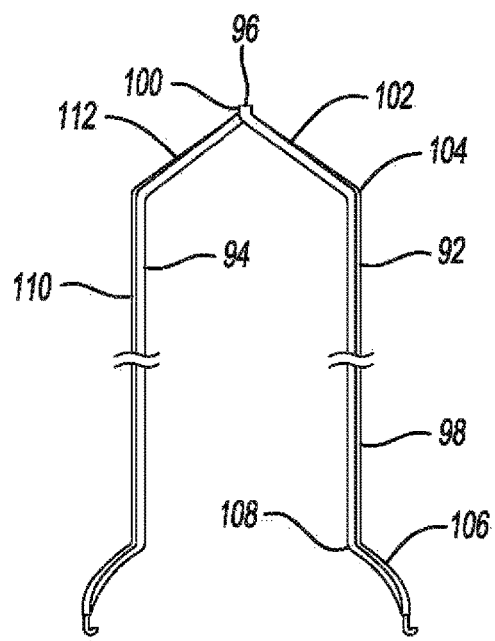
FIG. 7 is an elevation view of a short 5-pitch hairpin.

Referring to FIG. 7, the 5-pitch pins 88 include a trailing leg 92 joined to a leading leg 94 at a vertex 96. The vertex 96 may be radially offset to place the legs 92, 94 in different slot positions. The vertex 96 may be formed with a twist 100 that radially offsets the legs by the dimension of one pin in the radial direction. The pins 88 may be formed from a single piece of metal such as copper, aluminum, silver, or any other electrically conductive material. The trailing leg 92 is adapted to be disposed in one of the slots 38 and the leading leg 94 is disposed in another of the slots 38 that is spaced apart by a span of five slots. The trailing leg 92 includes a straight portion 98 that is received in a slot 34 and a first angled portion 102 that extends between the vertex 96 and the straight portion 98. The straight portion 98 and the angled portion 102 are joined at a bend 104. The trailing leg 92 also includes a twist 106 that is angled outward at a second bend 108. The second leg 94 includes a straight portion 110 disposed within a slot 34 and an angled portion 112 that extends between the vertex 96 and the straight portion 110. The first and second angled portions 102, 112 and the vertex 96 are collectively referred to as the crown 50.

Figure 8:
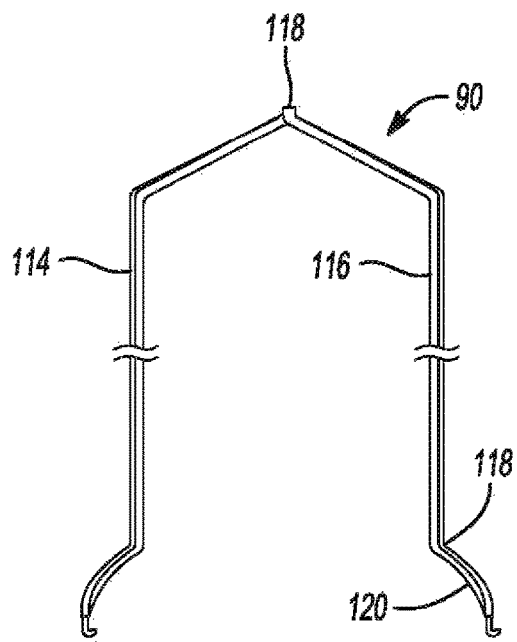
FIG. 8 is an elevation view of a long 7-pitch hairpin.

Referring to FIG. 8, the 7-pitch pins 90 include a trailing leg 114 joined to a leading leg 116 at a vertex 118. The vertex 118 may be radially offset to place the legs 114, 116 in different slot positions. The vertex 118 may be formed with a twist 120 that radially offsets the legs by the dimension of one pin in the radial direction. Like the 5-pitch pins, the pins 90 may be formed from the same type of electrically conductive material. The first leg 114 is adapted to be disposed in one of the slots 38 and the second leg 116 is disposed in another of the slots 38 that is spaced apart by a span of seven slots. The second leg 100 also includes a twist 120 that is angled outward at a second bend 118.

Referring to FIG. 6, a diagram showing the pin insertion pattern for the U-phase is provided. The 5-pitch pins 88 alternate with the 7-pitch pins 90 in each path. The parallel paths include a 5-pitch pin 88 that is nested with, or axially adjacent, a 7-pitch pin 90 in the paired path. For example, the first path 56 starts with a 7-pitch pin 90 that is joined to a 5-pitch pin 88, that is joined to a 7-pitch pin 90, that is joined to a 5-pitch pin 88, and so on. The second path 58 starts with a five pitch pin 88 that is joined to a 7-pitch pin 90, that is joined to a 5-pitch pin 88, that is joined to a 7-pitch pin 90, and so on. The paired paths 56 and 58 are nested wherein the starting pin on path 56 is a 7-pitch pin 90 while the starting pin on path 58 is a 5-pitch pin 88 that is nested within the axially adjacent 7-pitch pin 90. The second pins in the paths alternate with a 5-pitch pin 88 in path 56 being nested within and axially adjacent the 7-pitch pin 90 in the second path 58.

The insertion pattern for the V-phase and the W-phase is the same but circumferentially shifted to other slots 38.

Figure 9:
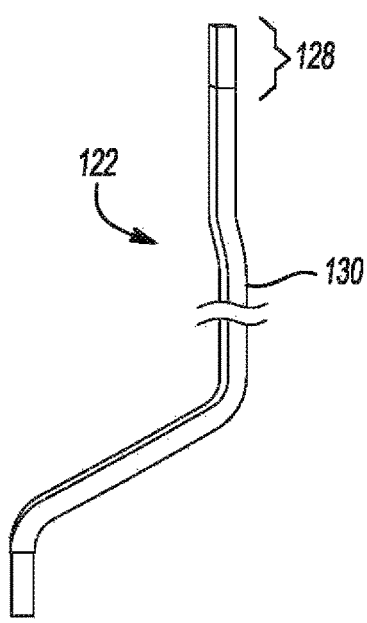
FIG. 9 is an elevation view of an inner diameter side I-pin.
Figure 10:
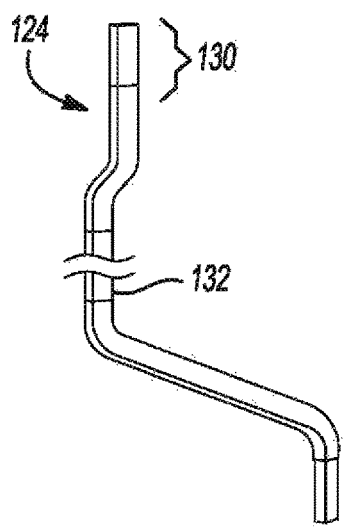
FIG. 10 is an elevation view of an outer diameter side I-pin.
Figure 11:
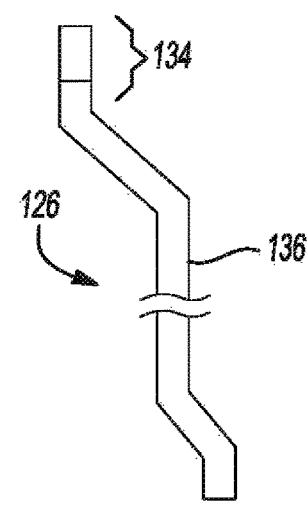
FIG. 11 is a winding diagram of a U-phase of the windings from a weld side of the stator.

Referring to FIGS. 9-11, an ID side I-pin 122 and an OD side I-pin 124 are shown that may be used to connect the paths to the phase terminals and neutral terminals. In addition to ID side I-pin 122 and OD side I-pin 124, half-crown pins 126 may be used to connect the paths to the phase terminals and neutral terminals.

Referring to FIG. 9, the ID side I-pin 122 is shown to include a terminal extension 128 that extends in an axial direction from a leg portion 130 that is axially received in one of the slots 38. The terminal extension 130 extends primarily in an axial direction to one of the terminals 66, 70, or 72 (shown in FIG. 4) on the crown side of the stator 24.

Referring to FIG. 10, the OD side I-pin 124 is shown to include a terminal extension 130 that primarily extends in an axial direction from a leg portion 132 that is axially received in one of the slots 38. The terminal extension 130 extends primarily in an axial direction to one of the terminals 66, 70, or 72 on the crown side of the stator 24.

Referring to FIG. 11, the half-crown pin 126 includes a terminal extension 134 that extends from a leg portion 136 that is axially received in one of the slots 38, wherein the half-crown pin 124 extends in a circumferential direction and an axial direction to one of the terminals 66, 70, or 72 on the crown side of the stator 24.

Combinations of ID side I-pins 122, OD side I-pins 124, and half-crown pins 126 may be used to avoid interference with other components. In a first option, no I-pins may be used. In a second option, a combination of I-pins and half-crown pins may be used. In a third option, all the pins may be I-pins. Neutral pins are generally positioned below the phase terminals. However, if there is insufficient space on the inner diameter the neutral pins can be positioned on top of the phase terminals.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A stator for an electric machine of an electric vehicle comprising:
   a stator core defining a plurality of slots that are arrayed circumferentially around a central axis of the stator; and
   a plurality of pins, wherein each of the pins are joined together with adjacent pins in conductive paths for each AC power phase, wherein the pins are arranged in four parallel winding paths that both start and end on a crown side of the stator, wherein two of the four parallel winding paths start at a phase terminal at an inner diameter of the stator and extend to a neutral terminal at an outer diameter of the stator, and wherein two of the four parallel winding paths start at a phase terminal at an outer diameter of the stator and extend to a neutral terminal at an inner diameter of the stator.

2. The stator of claim 1 further comprising:
   a plurality of terminals on the crown side that are each connected to one of the four parallel winding paths with at least one I-pin that includes a terminal extension that extends in an axial direction from a leg portion that is axially received in one of the slots and extends solely in the axial direction to a terminal on the crown side of the stator.

3. The stator of claim 2 wherein the at least one I-pin terminal on the crown side includes at least one phase lead terminal and at least one neutral terminal.

4. The stator of claim 2 further comprising:
   a plurality of terminals on the crown side that are each connected to one of the four parallel winding paths with at least one half-crown pin that includes a terminal extension that extends from a leg portion that is axially received in one of the slots, wherein the at least one half-crown pin extends in a circumferential direction and an axial direction to one of the terminals on the crown side of the stator.

5. The stator of claim 4 wherein the at least one I-pin terminal on the crown side includes at least one phase lead terminal and at least one neutral terminal.

6. An electric machine having a plurality of AC power phases comprising:
   a rotor;
   a stator defining a plurality of slots; and
   a plurality of pins that are each joined together with a circumferentially adjacent pin to form four parallel winding paths for each power phase, wherein the pins include only 5-pitch pins and 7-pitch pins, wherein the pins in each of the four parallel winding paths alternate with one of the 5-pitch pins being connected in series with one of the 7-pitch pins that is repeated throughout a stator core assembly from a lead pin connector to a neutral pin connector.

7. The electric machine of claim 6 wherein two of the four parallel winding paths start at a phase terminal at an inner diameter of the stator and extend to a neutral terminal at an outer diameter of the stator, and wherein the other two of the four parallel winding paths start at a phase terminal at an outer diameter of the stator and extend to a neutral terminal at an inner diameter of the stator.

8. The electric machine of claim 6 further comprising:
   a plurality of terminals on the crown side that are each connected to one of the four parallel winding paths with at least one I-pin that includes a terminal extension that extends in an axial direction from a leg portion that is axially received in one of the slots and extends solely in the axial direction to one of the terminals on the crown side of the stator.

9. The electric machine of claim 8 wherein the at least one I-pin terminal on the crown side includes at least one phase lead terminal and at least one neutral terminal.

10. The electric machine of claim 6 further comprising:
    a plurality of terminals on the crown side that are each connected to one of the four parallel winding paths with at least one half-crown pin that includes a terminal extension that extends from a leg portion that is axially received in one of the slots, wherein the half-crown pin extends in a circumferential direction and an axial direction to one of the terminals on the crown side of the stator.

11. The electric machine of claim 10 wherein the crown side includes at least one phase lead terminal that is an I-pin and at least one neutral terminal that is an I-pin.

12. An electric machine having a plurality of AC power phases comprising:
    a rotor;
    a stator defining a plurality of slots; and
    a plurality of pins inserted into the slots are each joined together with circumferentially adjacent pins arranged in an even number of paired parallel winding paths, wherein each of the paired parallel winding paths include five pitch pins and seven pitch pins that are radially adjacent and insulated from each other, and wherein the five pitch pins are electrically connected and circumferentially followed by seven pitch pins in the winding paths in a repeating pattern throughout the paired winding paths from separate phase terminals to a neutral bridge terminal.

13. The electric machine of claim 12 wherein four parallel winding paths are provided and wherein two of the paired parallel winding paths start at a phase terminal at an inner diameter of the stator and extend to a neutral terminal at an outer diameter of the stator, and wherein two of the paired parallel winding paths start at a phase terminal at an outer diameter of the stator and extend to a neutral terminal at an inner diameter of the stator.

14. The electric machine of claim 12 further comprising:
    a plurality of terminals on a crown side that are each connected to one of the paired parallel winding paths with at least one I-pin that includes a terminal extension that extends in an axial direction from a leg portion that is axially received in one of the slots and extends solely in the axial direction to a terminal on the crown side of the stator.

15. The electric machine of claim 14 wherein the at least one I-pin terminal on the crown side includes at least one phase lead terminal and at least one neutral terminal.

16. The electric machine of claim 14 further comprising:
    a plurality of terminals on the crown side that are each connected to one of the paired parallel winding paths with at least one half-crown pin that includes a terminal extension that extends from a leg portion that is axially received in one of the slots, wherein the half-crown pin extends in a circumferential direction and an axial direction to one of the terminals on the crown side of the stator.

17. The electric machine of claim 16 wherein the at least one I-pin terminal on the crown side includes at least one phase lead terminal and at least one neutral terminal.

* * * * *